(12) United States Patent
Yamada et al.

(10) Patent No.: US 8,275,198 B2
(45) Date of Patent: *Sep. 25, 2012

(54) IMAGE PROCESSING APPARATUS, IMAGE PROCESSING METHOD AND COMPUTER READABLE MEDIUM WITH COMPRESSION PROCESSING FOR EACH COLOR

(75) Inventors: Toshiyuki Yamada, Ebina (JP); Nobuo Inoue, Tokyo (JP); Minoru Sodeura, Ebina (JP); Tsutomu Kimura, Minamiashigara (JP); Shintaro Adachi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 369 days.

This patent is subject to a terminal disclaimer.

(21) Appl. No.: 12/579,824

(22) Filed: Oct. 15, 2009

(65) Prior Publication Data

US 2010/0246946 A1    Sep. 30, 2010

(30) Foreign Application Priority Data

Mar. 27, 2009  (JP) ................................. 2009-078041

(51) Int. Cl.
 *G06K 9/36*  (2006.01)
 *G06K 9/46*  (2006.01)
 *G06K 9/00*  (2006.01)

(52) U.S. Cl. ....................................... 382/166; 382/190

(58) Field of Classification Search .................. 382/162, 382/164, 165, 166, 173, 190, 195, 232, 240; 358/1.12, 1.9, 515, 518, 523, 525, 529, 530; 345/589, 600–604

See application file for complete search history.

(56) References Cited

U.S. PATENT DOCUMENTS

| | | | | |
|---|---|---|---|---|
| 5,333,063 A * | 7/1994 | Yoo | ............................... | 358/448 |
| 5,825,917 A * | 10/1998 | Suzuki | .......................... | 382/164 |
| 5,933,249 A | 8/1999 | Shimura et al. | | |
| 6,426,809 B1 * | 7/2002 | Hayashi et al. | ............... | 358/529 |
| 6,441,913 B1 * | 8/2002 | Anabuki et al. | .............. | 358/1.12 |
| 6,836,564 B2 | 12/2004 | Katayama et al. | | |
| 7,336,818 B2 * | 2/2008 | Kondo et al. | ................. | 382/164 |
| 7,355,749 B2 | 4/2008 | Nishide et al. | | |
| 7,884,977 B2 | 2/2011 | Mori | | |

(Continued)

FOREIGN PATENT DOCUMENTS

JP   07-236062 A   9/1995

(Continued)

OTHER PUBLICATIONS

Notification of Reasons for Refusal dated Nov. 30, 2010, issued in corresponding Japanese Application No. 2009-078041.

(Continued)

*Primary Examiner* — Amir Alavi
(74) *Attorney, Agent, or Firm* — Sughrue Mion, PLLC

(57) ABSTRACT

An image processing apparatus includes: a limited color conversion processing section that extracts a plurality of pieces of color information making up image information and executes conversion to specific colors to which the color information belongs; a by-color separation processing section that separates for each specific color, image information converted into the specific colors by the limited color conversion processing section; a compression processing section that compresses for each color, the image information for each specific color separated by the by-color separation processing section; and a layered structure forming processing section that collectively outputs the image information for each color compressed by the compression processing section.

7 Claims, 13 Drawing Sheets

U.S. PATENT DOCUMENTS

| | | | |
|---|---|---|---|
| 2009/0274363 A1* | 11/2009 | Dai | 382/164 |
| 2010/0246942 A1* | 9/2010 | Adachi et al. | 382/164 |
| 2010/0246946 A1* | 9/2010 | Yamada et al. | 382/166 |
| 2010/0303360 A1* | 12/2010 | Matsuda | 382/195 |

FOREIGN PATENT DOCUMENTS

| | | |
|---|---|---|
| JP | 09-127924 A | 5/1997 |
| JP | 2003-244447 A | 8/2003 |
| JP | 2005-269271 A | 9/2005 |
| JP | 2005-323066 A | 11/2005 |
| JP | 2008-288912 A | 11/2008 |

OTHER PUBLICATIONS

Notification of Reasons for Refusal issued Dec. 8, 2010 in counterpart Japanese Application No. 2009-078038.

* cited by examiner

16 COLORS

8 COLORS

IMAGE PROCESSING APPARATUS, IMAGE PROCESSING METHOD AND COMPUTER READABLE MEDIUM WITH COMPRESSION PROCESSING FOR EACH COLOR

CROSS-REFERENCE TO RELATED APPLICATIONS

This application is based on and claims priority under 35 USC 119 from Japanese Patent Application No. 2009-078041 filed Mar. 27, 2009.

BACKGROUND

1. Technical Field

This invention relates to an image processing apparatus, an image processing method and a computer readable medium.

2. Related Art

In recent years, it has been a general practice to scan a paper document with a digital multiple function device, etc., and electronically retain or distribute the document. Here, reducing file size per document leads to storing larger amounts of documents electronically or transferring larger amounts of documents using a communication line. In order to reduce the file size, data may be compressed at high compressibility; however, if the compressibility is made high, degradation of the image quality occurs.

SUMMARY

According to an aspect of the invention, an image processing apparatus includes: a limited color conversion processing section that extracts a plurality of pieces of color information making up image information and executes conversion to specific colors to which the color information belongs; a by-color separation processing section that separates for each specific color, image information converted into the specific colors by the limited color conversion processing section; a compression processing section that compresses for each color, the image information for each specific color separated by the by-color separation processing section; and a layered structure forming processing section that collectively outputs the image information for each color compressed by the compression processing section.

BRIEF DESCRIPTION OF THE DRAWINGS

Exemplary embodiment(s) of the present invention will be described in detail based on the following figures, wherein.

DETAILED DESCRIPTION

An exemplary embodiment of the invention will be discussed below in the following order:

1. General configuration of image processing apparatus
2. Configuration of subtractive color processing section
3. Configuration of limited color conversion processing section
4. Configuration of by-color separation processing section
5. Image processing program <1. General Configuration of Image Processing Apparatus>

Figure 1:
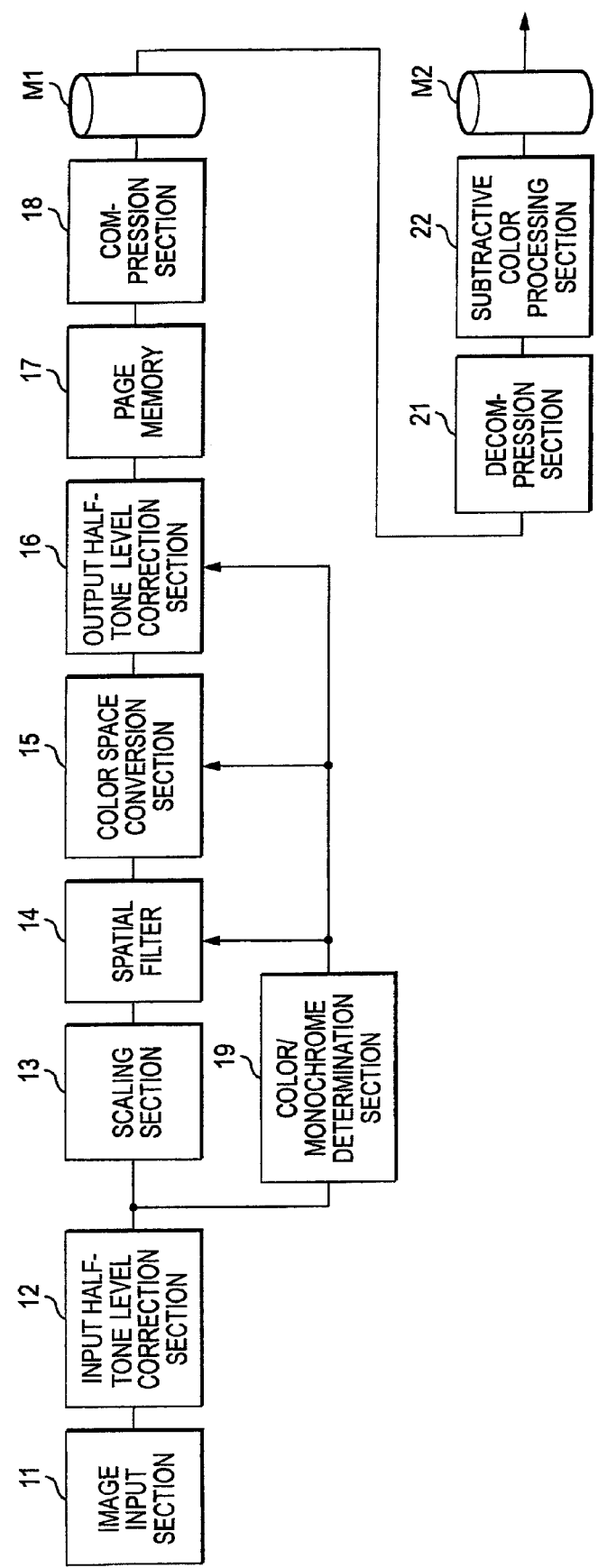
FIG. 1 is a block diagram to describe the general configuration of an image processing apparatus according to an exemplary embodiment of the invention.

FIG. 1 is a block diagram to describe the general configuration of an image processing apparatus according to an exemplary embodiment of the invention. In the description of the exemplary embodiment, as the image processing apparatus, a digital multiple function device is taken as an example, but the image processing apparatus according to the exemplary embodiment is not limited to the digital multiple function device and is also applied to any other device such as photographing with a digital camera (for example, whiteboard mode, etc.).

The image processing apparatus includes an image input section 11, an input halftone level correction section 12, a scaling section 13, a spatial filter 14, a color space conversion section 15, an output halftone level correction section 16, page memory 17, a compression section 18, a first storage section M1, a color/monochrome determination section 19, a decompression section 21, a subtractive color processing section 22, and second storage section M2.

The image input section 11 acquires electronic data of an image to be processed. For example, it may be a scanner for acquiring electronic data of an image from a document or may be a section for acquiring electronic data transmitted from an external computer, etc., through a network.

The input halftone level correction section 12 is a section for correcting halftone level in the electronic data of the image acquired in the image input section 11. For example, it makes a halftone level correction based on a predetermined tone curve.

The scaling section 13 performs processing of scaling up or down the electronic data of the image in response to a predetermined enlargement ratio or reduction ratio. The spatial filter 14 filters the electronic data of the image using a predetermined spatial filter. For example, a predetermined spatial filter is applied to the electronic data of the image and processing of MTF (Modulation Transfer Function) correction, etc., responsive to the characteristic of the spatial filter (for example, noise removal, smoothing processing, enhancement processing) is performed.

The color space conversion section 15 is a section for converting a color space representing the electronic data of the image (pixel value). For example, it performs processing of converting RCB color space into YCbCr color space. The output halftone level correction section 16 is a section for making a halftone level correction matched with the characteristic of an output unit. The page memory 17 is a section for temporarily retaining the electronic data of the image of each page.

The compression section 18 is a section for compressing the electronic data of the image according to a predetermined compression system (for example, JPEG (Joint Photographic Experts Group)). The first storage section M1 is a section for retaining the compressed image data. For example, a hard disk drive is used as the first storage section M1.

The color/monochrome determination section 19 is a section for determining whether the image is a color image or a monochrome (single color) image based on the electronic data of the image acquired in the image input section 11. The determination result is reflected on the spatial filter 14, the color space conversion section 15, and the output halftone level correction section 16.

The decompression section 21 performs processing of decompressing the compressed image data stored in the first storage section M1. The subtractive color processing section 22 performs processing of decreasing color to specific color for the electronic data of the image decompressed in the decompression section 21. The subtractive color processing section 22 is one of the characteristic portions of the image processing apparatus of the exemplary embodiment and is described later in detail.

The second storage section M2 is a section for storing the image data after the subtractive color processing. For example, a hard disk drive is used as the second storage section M2. The second storage section M2 may share the device with the first storage section M1. The image data subjected to the subtractive color processing stored in the second storage section M2 is sent to the outside through the network.

<2. Configuration of Subtractive Color Processing Section>

Figure 2:
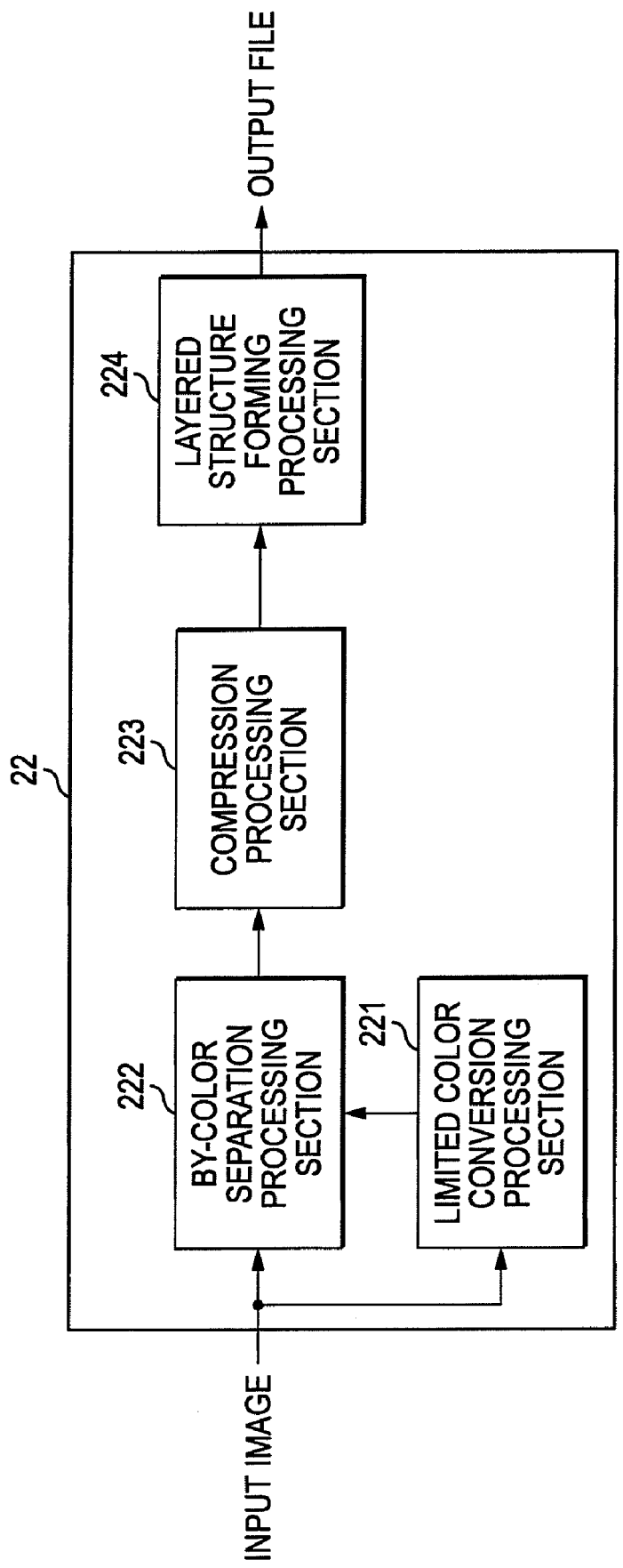
FIG. 2 is a block diagram to describe the configuration of a subtractive color processing section.

FIG. 2 is a block diagram to describe the configuration of the subtractive color processing section. The subtractive color processing section 22 includes a limited color conversion processing section 221, a by-color separation processing section 222, a compression processing section 223, and a layered structure forming processing section 224.

The limited color conversion processing section 221 extracts a plurality of pieces of color information making up an image from an input image (electronic data of the image sent from the decompression section 21 shown in FIG. 1) and converts color into specific color to which the extracted color information belongs. The limited color conversion processing section 221 is described later in detail.

The by-color separation processing section 222 performs processing of separating the post-converted data converted into a plurality of colors by the limited color conversion processing section 221 to image data for each color.

The compression processing section 223 performs processing of compressing a plurality of pieces of image data separated by color by the by-color separation processing section 222 for each piece of data by color.

The layered structure forming processing section 224 performs processing of collecting image data by color compressed by the compression processing section 223 into one file for output. The output file is once stored in the second storage section M2 shown in FIG. 1 and then is sent through the network.

<3. Configuration of Limited Color Conversion Processing Section>

Figure 3:
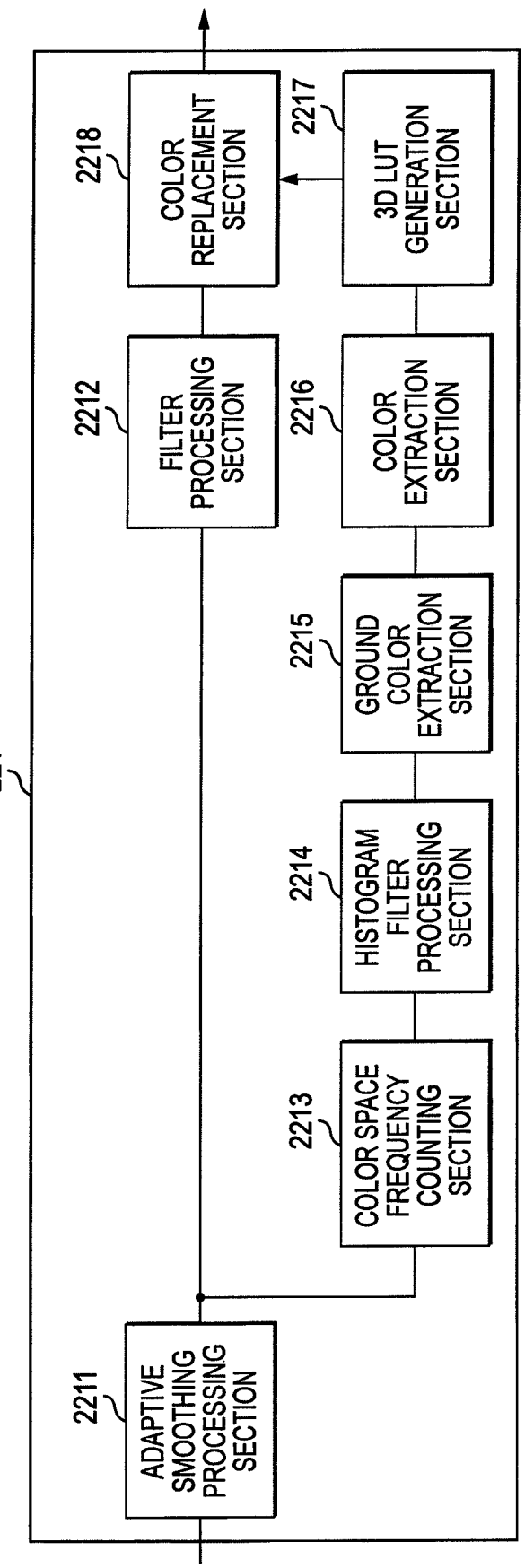
FIG. 3 is a block diagram to describe the configuration of a limited color conversion processing section.

FIG. 3 is a block diagram to describe the configuration of the limited color conversion processing section. The limited color conversion processing section 221 includes an adaptive smoothing processing section 2211, a filter processing section 2212, a color space frequency counting section 2213, a histogram filter processing section 2214, a ground color extraction section 2215, a color extraction section 2216, a 3D LUT generation section 2217, and a color replacement section 2218.

The adaptive smoothing processing section 2211 is a section for performing smoothing processing of an input image (electronic data of the image sent from the decompression section 21 shown in FIG. 1) to remove noise from the electronic data of the input image.

The filter processing section 2212 is a section for performing enhancement processing for the electronic data of the image after subjected to the smoothing processing using 5×5 filters, for example.

Figure 4:
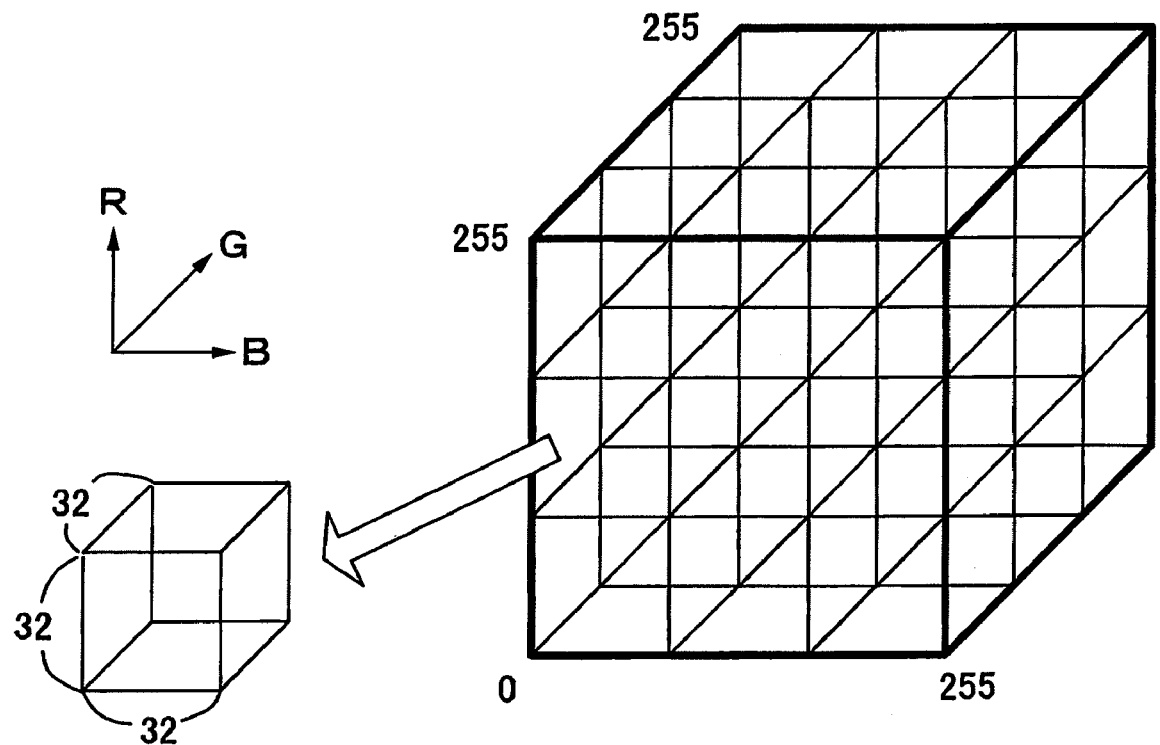
FIG. 4 is a schematic drawing to describe area splitting of color space.

The color space frequency counting section 2213 performs processing of counting the occurrence frequency (histogram) of pixel value about the electronic data of the image after subjected to the smoothing processing. Histogram generation of the color space frequency counting section 2213 will be discussed. FIG. 4 is a schematic drawing to describe area splitting of color space. To generate a histogram, the color space frequency counting section 2213 splits a three-dimensional color space in the electronic data of the image into predetermined areas and counts the frequency for each split area.

As shown in FIG. 4, for example, if the halftone level values that can be taken in an RGB color space are 0 to 255, the halftone level values of each of R, G, and R are divided into eight equal groups every 32 halftone levels. Accordingly, the RGB color space is split into 8×8×8=512 areas. The color space frequency counting section 2213 counts the frequency for each of the 512 split areas. The split units are shown by way of example and are set as required.

The histogram filter processing section 2214 shown in FIG. 3 is a section for filtering processing of extracting only values exceeding a predetermined frequency about the histogram for each split area counted by the color space frequency counting section 2213. The histogram filter processing section 2214 extracts the peak of the histogram using a three-dimensional second derivative filter.

The ground color extraction section 2215 performs processing of extracting the ground color (color of ground surface) of image data based on the histogram filtered by the histogram filter processing section 2214. For example, it extracts the color having the highest frequency as the ground color among candidate colors becoming a preset ground color. Various methods of ground color extraction processing are applied.

The color extraction section 2216 performs processing of extracting a specific color (representative color) from among the peaks of the histograms filtered and extracted by the histogram filter processing section 2214. Specifically, first, from candidate colors, a color lower than preset saturation is excluded from among the extracted peaks (peak colors) of the histograms.

Next, a representative color is selected from among the remaining peak colors. To select the representative color, for example, a color having a feature amount of hue, etc., deviating from the feature amount a preset predetermined amount or more is selected. The number of representative colors is set so as not to exceed the preset upper limit. That is, the representative colors are selected so as not to exceed the upper limit number of colors in the descending order of the frequency among the colors selected as the representative colors The 3D LUT generation section 2217 generates a 3D LUT (three-dimensional lookup table) for replacing color with the representative color extracted by the color extraction section 2216. That is, the 3D LUT associates the predetermined pixel value range of image data and the selected representative color with each other. Accordingly, each pixel value of the image data is converted into the specific representative color associated with the range to which the pixel value belongs.

The color replacement section 2218 performs processing of replacing each pixel value of the image data with any representative color using the 3D LUT generated by the 3D LUT generation section 2217. Accordingly, the image data is represented with the representative color, which decreases the number of colors of the image data.

<4. Configuration of By-Color Separation Processing Section>

Figure 5:
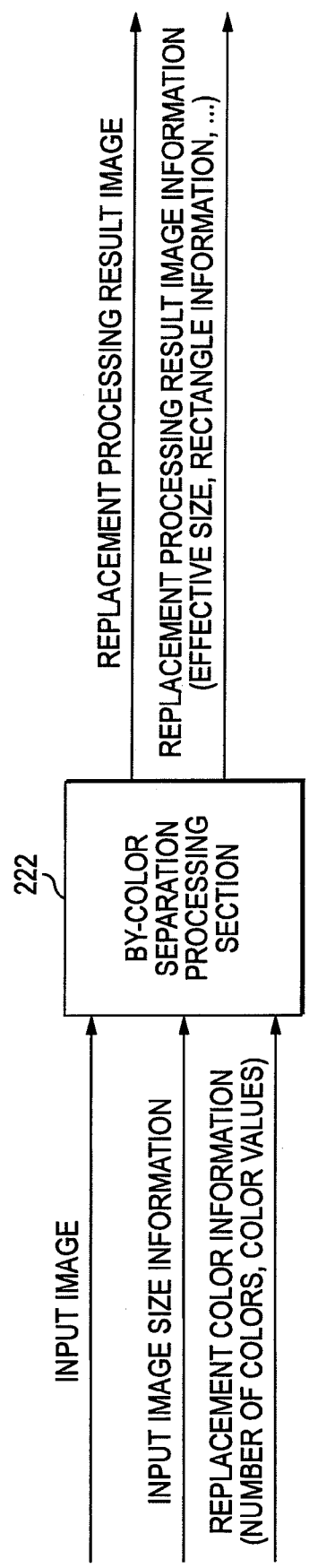
FIG. 5 is a drawing to describe the configuration of a by-color separation processing section.

FIG. 5 is a drawing to describe the configuration of the by-color separation processing section. The input image (electronic data of the image sent from the decompression section 21 shown in FIG. 1), size information of the input image, and replacement color information (number of colors, color values) output from the limited color conversion processing section are input to the by-color separation processing section 222. The by-color separation processing section 222 separates data as data of a layered structure for each representative color based on the input information and outputs a result image. It also outputs information of the result image of the layered structure (effective size, rectangle information, etc.).

Figure 6:
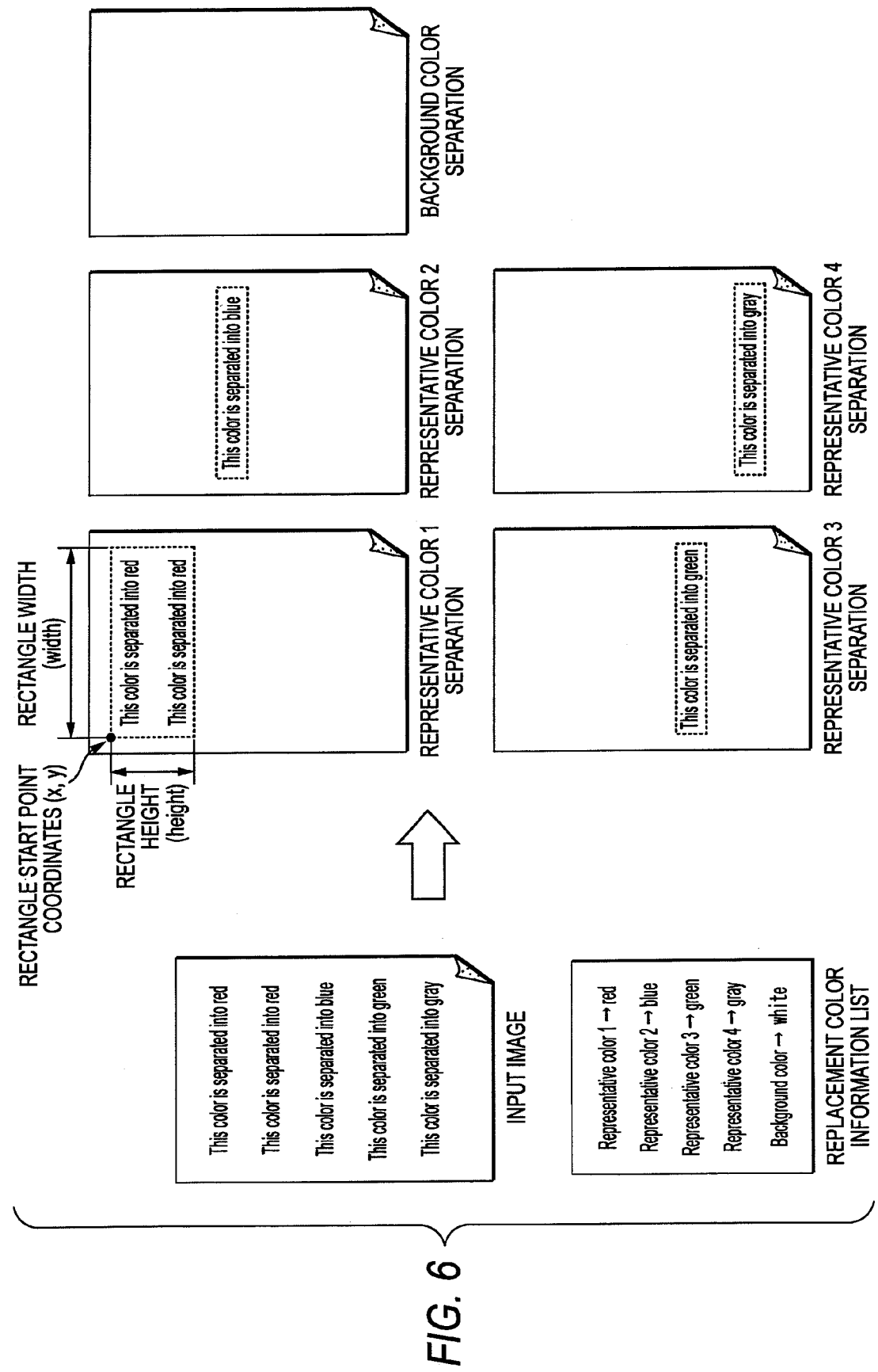
FIG. 6 is a schematic drawing to describe data separation of a by-color separation processing section.

FIG. 6 is a schematic drawing to describe the data separation of the by-color separation processing section. The by-color separation processing section separates the image data replaced with the representative color for each representative color and sets data of layered structure. The data of the layered structure includes data provided by converting the pixel value of each pixel for each representative color into a binary value and information of a circumscribed rectangle containing the pixel of the representative color, namely, information of the start point coordinates, the rectangle height, and the rectangle width of the circumscribed rectangle within a page.

In the example shown in FIG. 6, four colors of "red," "blue," "green," and "gray" are selected as the representative colors and data is separated for each of the representative colors and is output as data of a layered structure. The data of each pixel of each representative color is converted into a binary value.

In addition to the representative colors, a background color is also output as data of a layered structure. Data of the background color includes the color value of the background color and information indicating a background. The background is specified for the whole page and thus need not have rectangle information. Like the data of the representative color, the background color may be allowed to have rectangle information (in this case, rectangle information of whole page). Accordingly, it becomes a data structure where the representative color and the background color are not discriminated.

Information separated as data of layered structure for each representative color and background color by the by-color separation processing section 222 is compressed for each data of layered structure by the compression processing section 223 shown in FIG. 2. Since the data for each color is binarized, compression processing such as run length coding is performed. Information need not be compressed in a structure where the color value of the background color and information indicating a background are included.

The layered structure forming processing section 224 shown in FIG. 2 performs processing of collecting the data of layered structure of the compressed representative color and background color into one file as the data format of layered structure and outputting the file. For example, MRC (Mixed Raster Content) can be named as the data format of layered structure.

<5. Image Processing Program>

Next, an image processing program according to the exemplary embodiment will be discussed. The image processing program according to the exemplary embodiment has steps that a computer is caused to execute. The computer includes a computation section for executing the image processing program according to the exemplary embodiment, a storage section for storing programs and various pieces of data, and an input/output section. The computer may be not only an electronic computer such as a personal computer, but also be built in an electronic device that can handle information, such as a video recording and playing apparatus or a mobile terminal. The image processing program of the exemplary embodiment is recorded on a record medium of a CD-ROM, etc., or is distributed through the network.

[Hardware Configuration]

Figure 7:
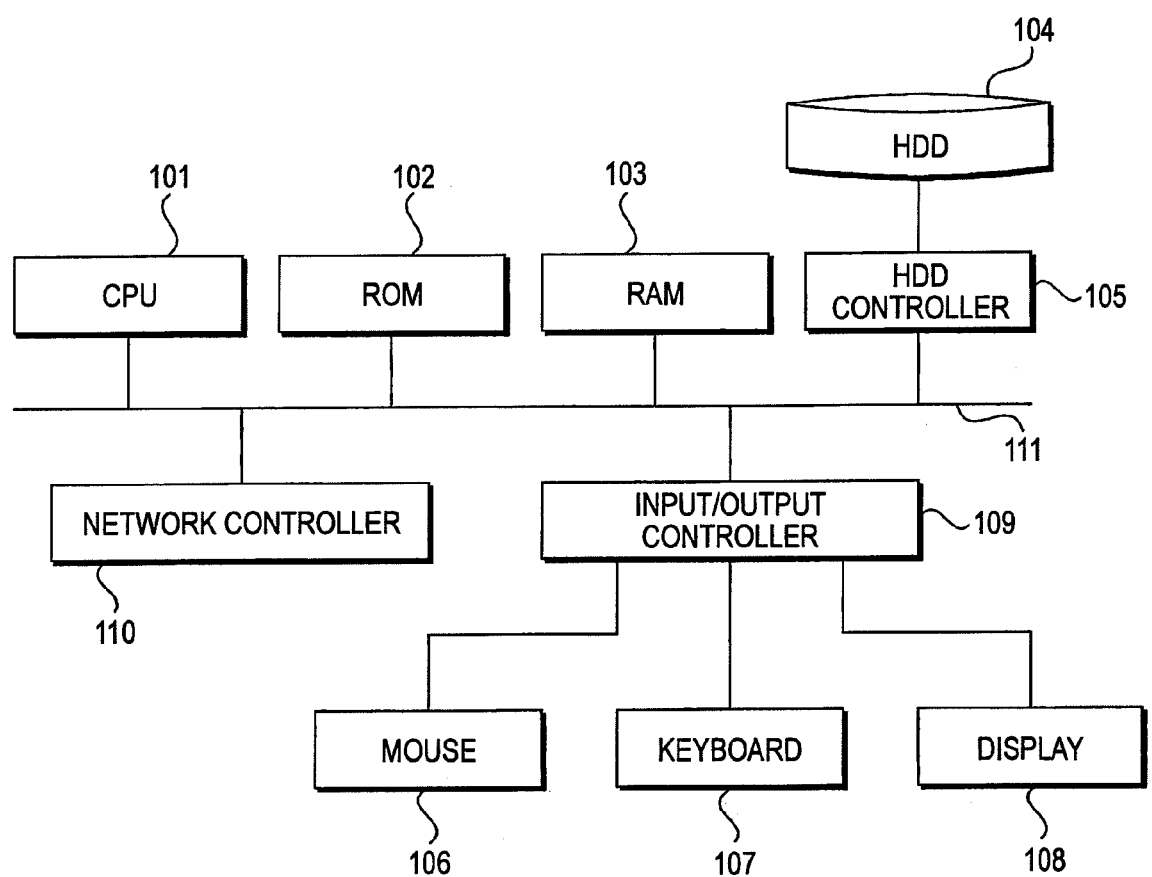
FIG. 7 is a block diagram to show the hardware configuration of a computer for executing an image processing program.

FIG. 7 is a block diagram to show the hardware configuration of the computer for executing the image processing program. As the hardware configuration of the computer, a CPU (Central Processing Unit) 101, ROM (Read-Only Memory) 102, RAM (Random Access Memory) 103, an HDD (Hard Disk Drive) 104, an HDD controller 105, a mouse 106, a keyboard 107, a display 108, an input/output controller 109, and a network controller 110 are connected by a bus 111.

The image processing program of the exemplary embodiment described later is stored in the HDD 104 in the hardware configuration and is read into the RAM 103 for execution and then is executed by the CPU 101.

[Flowchart: Program Corresponding to Limited Color Conversion Processing Section]

Figure 8:
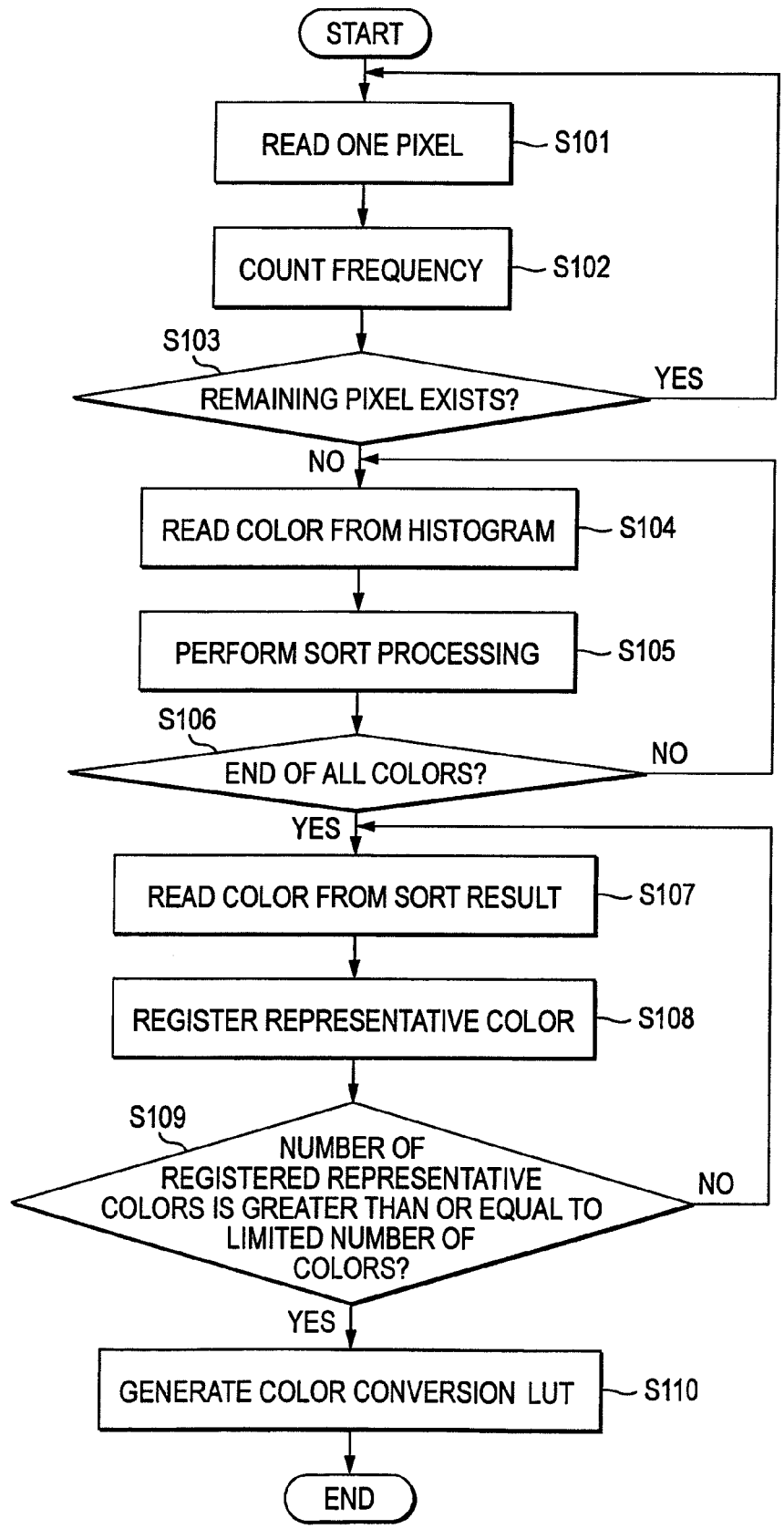
FIG. 8 is a flowchart to describe a flow of a program corresponding to a limited color conversion processing section.

FIG. 8 is a flowchart to describe a flow of a program corresponding to a limited color conversion processing section. To begin with, the pixel value of one pixel of an input image is read (step S101) and a frequency is counted (step S102). The processing is performed for all pixels of the input image (step S103).

Next, color involving a frequency is read from histogram (step S104) and is sorted in the descending order of the frequencies (step S105). Reading of color involving a frequency and sort processing are repeated in all colors each involving a frequency (step S106).

Next, color is read in the descending order of the frequencies from the sort processing result (step S107) and is registered as representative color (step S108). Next, whether or not the number of registered representative colors is greater than or equal to the limited number of colors is determined (step S109). If the number of registered representative colors is less than the limited number of colors (NO at step S109), steps S107 and S108 are repeated.

Then, a color conversion LUT (3D LUT) indicating the correspondence between the registered representative colors and the pixel values is generated (step S110).

[Flowchart: Program Corresponding to Color Replacement Section]

Figure 9:
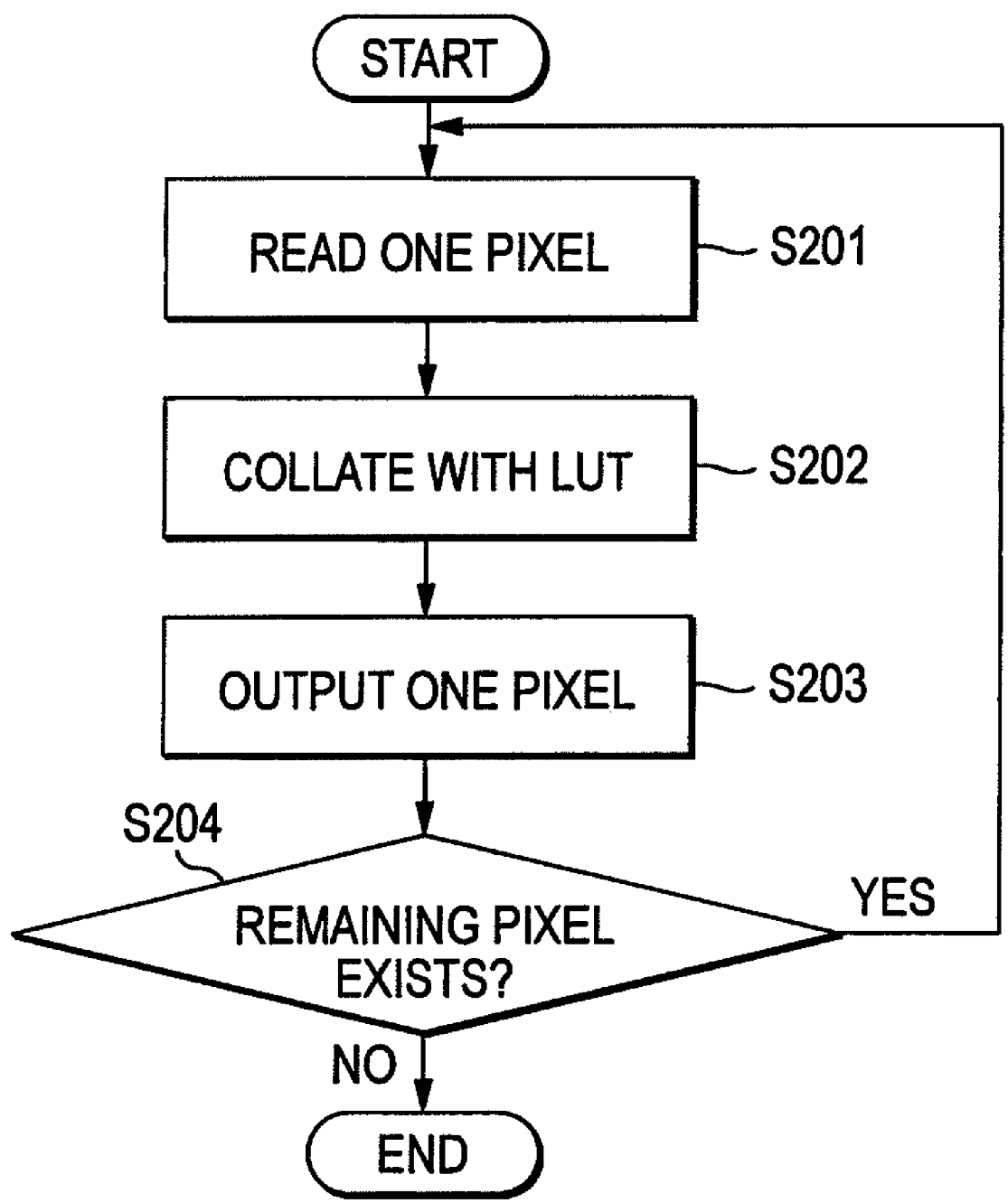
FIG. 9 is a flowchart to describe a flow of a program corresponding to a color replacement section.

FIG. 9 is a flowchart to describe a flow of a program corresponding to a color replacement section. To begin with, the pixel value of one pixel of an input image is read (step S201). Next, the read pixel value is collated with the color conversion LUT (3D LUT) and the corresponding representative color is determined (step S202) and is output as the value of the pixel (step S203). The processing is repeated for all pixels (step S204).

Figure 10A:
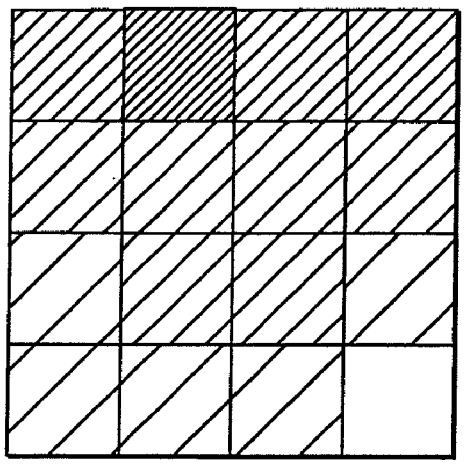
FIGS. 10A and 10B are schematic drawings to describe an example of color replacement according to processing in the color replacement section.
Figure 10B:
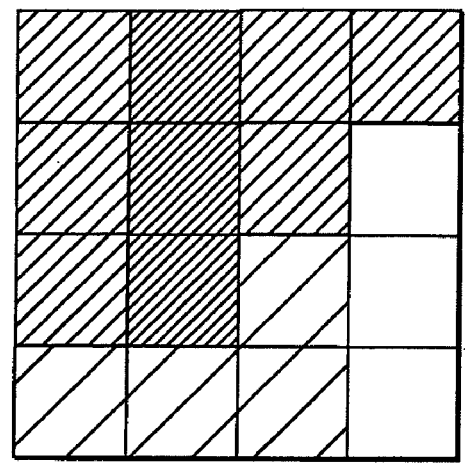

FIGS. 10A and 10B are schematic drawings to describe an example of color replacement according to processing in the color replacement section. Here, the pixel values of 16 colors represented in the color space of an original image shown in FIG. 10A are decreased to the pixel values of eight colors as shown in FIG. 103 according to the color conversion LUT.

[Flowchart: Program Corresponding to by-Color Separation Processing Section]

Figure 11:
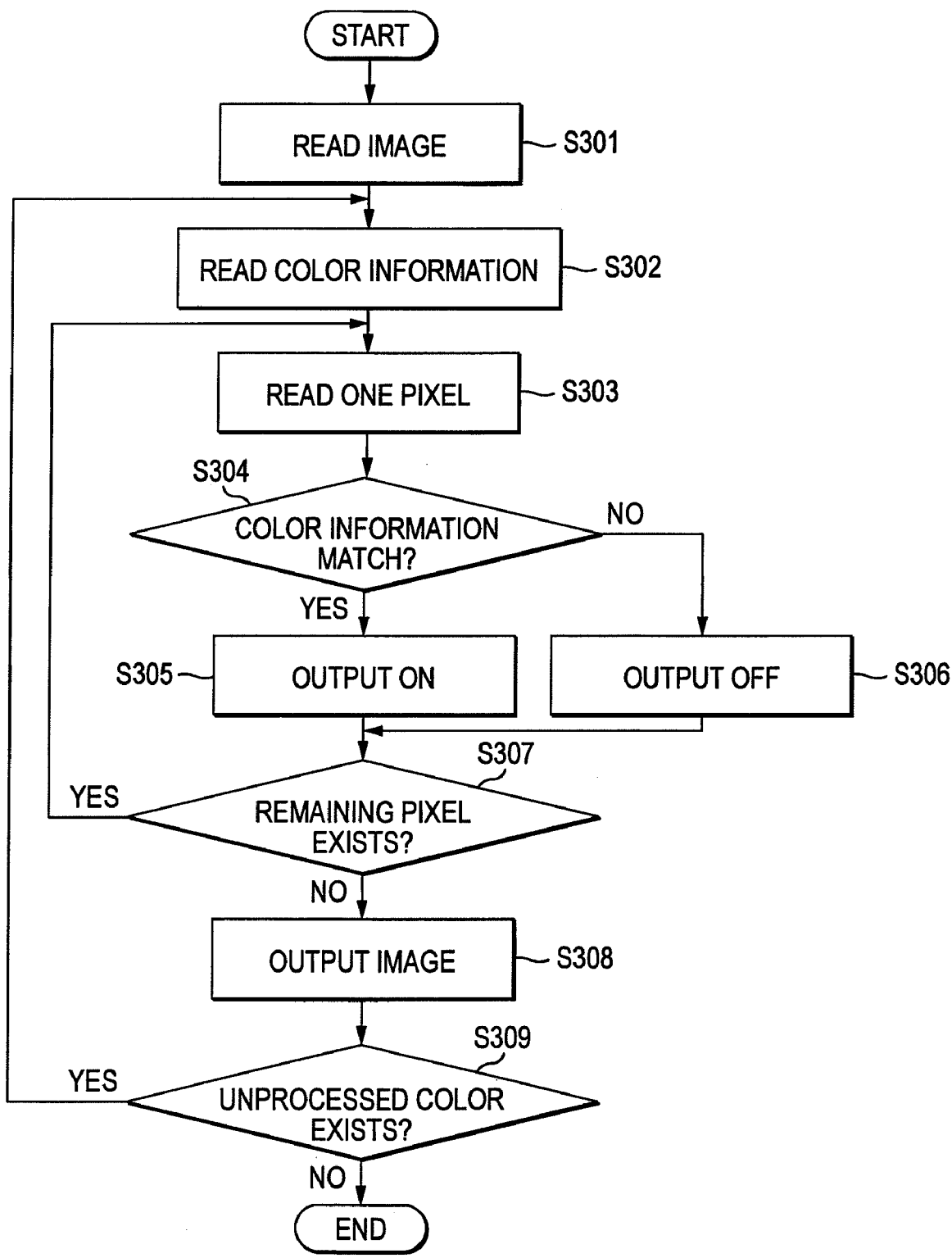
FIG. 11 is a flowchart to describe a flow of a program corresponding to a by-color separation processing section.

FIG. 11 is a flowchart to describe an example of a flow of a program corresponding to a by-color separation processing section. To begin with, image information with colors decreased is read (step S301) and color information of one of representative colors is read (step S302). Next, the pixel value of one pixel is read (step S303). Whether or not the pixel value matches the previously read color information is determined (step S304). If they match, ON is output (S305); if they do not match, OFF is output (S306). The processing is repeated for the pixel values of all pixels (step S307). Accordingly, binary data of a layered structure wherein the pixel matching the representative color read at step S302 becomes ON output and any other pixel becomes OFF output is output (step S308). The output processing of the layered structure data is performed for all color information (step 5309). The program flow shown in FIG. 11 is a processing example of the by-color separation processing section and any method may be adopted if it is a method of outputting binary data of a layered structure for each color.

[Flowchart: Program Corresponding to Compression Processing Section]

Figure 12:
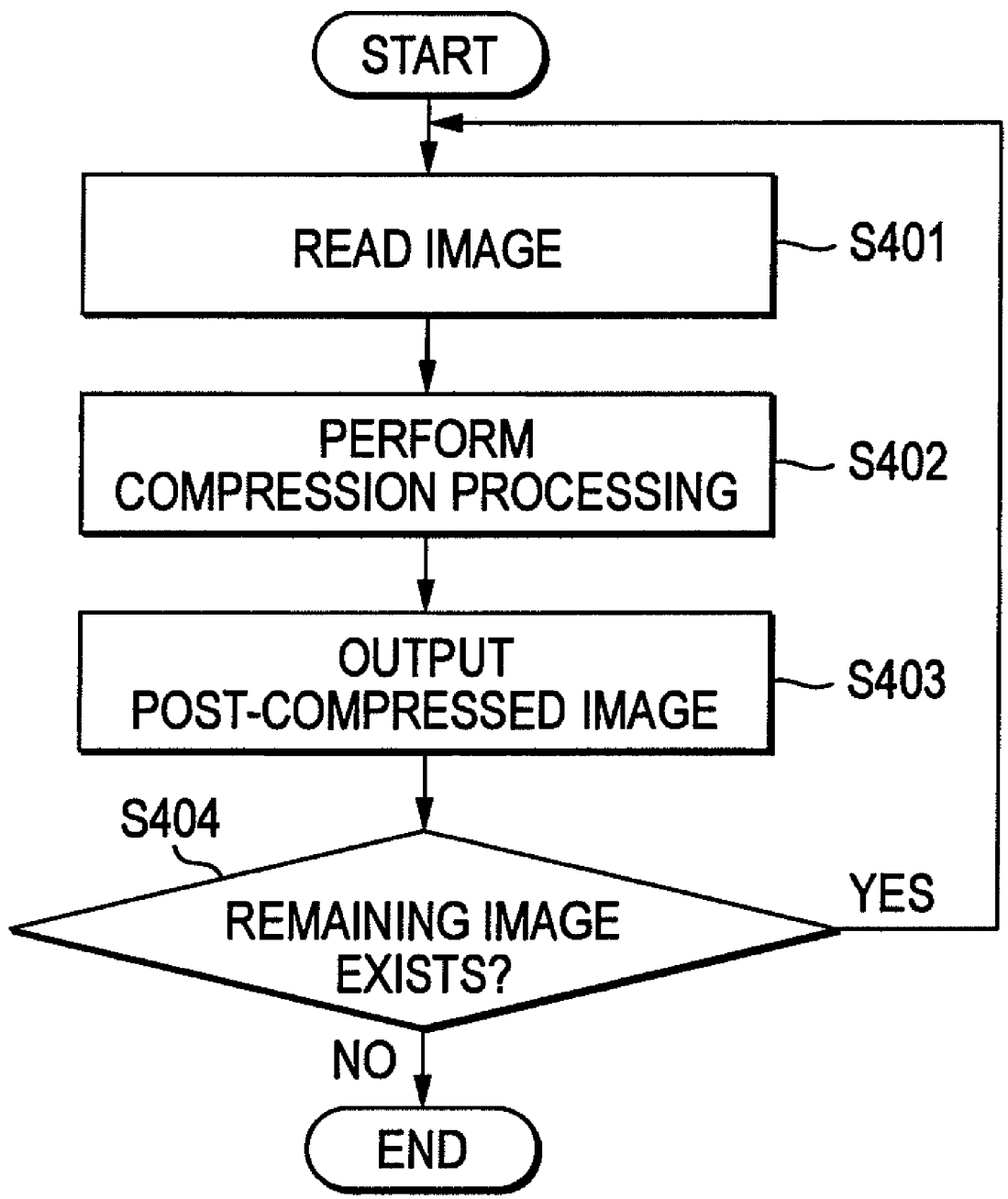
FIG. 12 is a flowchart to describe a flow of a program corresponding to a compression processing section.

FIG. 12 is a flowchart to describe a flow of a program corresponding to a compression processing section. In the program, compression is executed in data units of layered structure output for each representative color. To begin with, layered structure data about a specific representative color is read (step S401). Next, compression processing is performed about binary data of ON output, OFF output of the layered structure data (step S402). Image data after subjected to the compression processing is output (step S403). The processing is performed for the layered structure data of all representative colors (step S404).

[Processing in Layered Structure Forming Processing Section]

Figure 13:
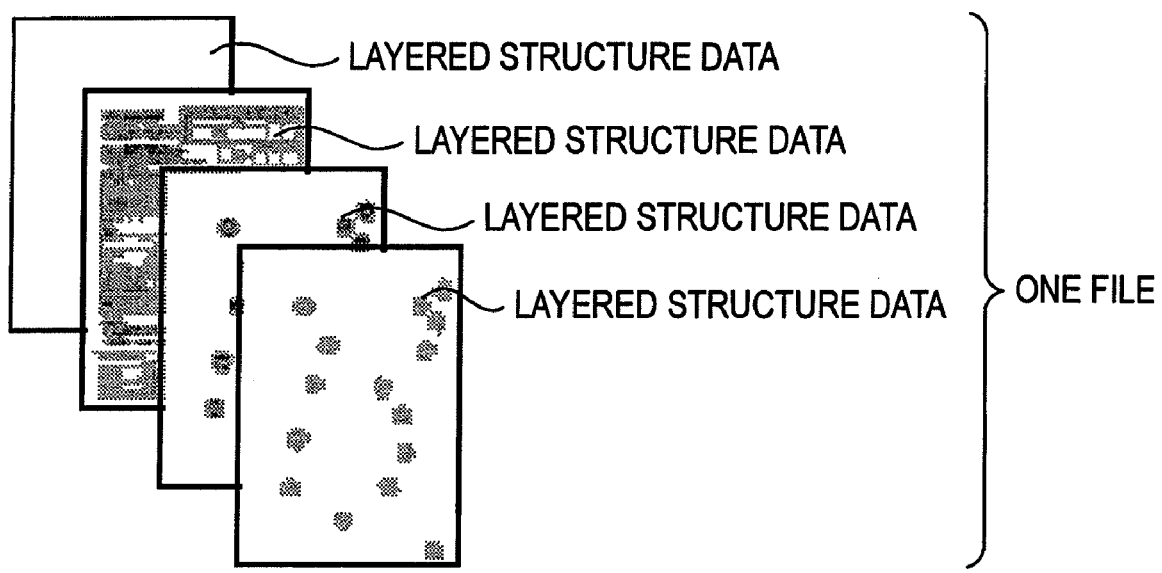
FIG. 13 is a schematic drawing to describe processing in a layered structure forming processing section.

FIG. 13 is a schematic drawing to describe processing in a layered structure forming processing section. The layered structure forming processing section performs processing of collecting the layered structure data and background color data compressed for each representative color into one file. Accordingly, the compressed data of layered structure of the representative colors and background color is output as one file.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a limited color conversion processing section that extracts a plurality of pieces of color information making up image information and executes conversion to specific colors to which the color information belongs;
a by-color separation processing section that separates for each specific color, image information converted into the specific colors by the limited color conversion processing section;
a compression processing section that compresses for each specific color, the image information for each specific color separated by the by-color separation processing section; and
a layered structure forming processing section that collectively outputs the image information for each specific color compressed by the compression processing section.

2. The image processing apparatus according to claim 1, wherein
the limited color conversion processing section sets the specific color from the frequency of a plurality of pieces of color information making up the image information.

3. The image processing apparatus according to claim 1, wherein
the limited color conversion processing section counts the frequency of color information for each of areas into which color space of the image information is split and sets the specific color from the counted frequency.

4. The image processing apparatus according to claim 1, wherein
the limited color conversion processing section sets the specific color with the preset number of colors as the upper limit.

5. The image processing apparatus according to claim 1, wherein
the limited color conversion processing section generates a lookup table for executing conversion to a specific color to which the color information belongs, and executes color conversion using the lookup table.

6. An image processing method comprising:
extracting a plurality of pieces of color information making up image information;
executing conversion to specific colors to which the color information belongs;
separating for each specific color, image information being converted into the specific colors;
compressing for each color, the image information being separated for each specific color; and
collectively outputting the image information being compressed for each color.

7. A non-transitory computer readable medium storing a program causing a computer to execute a process for image processing, the process comprising:
extracting a plurality of pieces of color information making up image information;
executing conversion to specific colors to which the color information belongs;
separating for each specific color, image information being converted into the specific colors;
compressing for each color, the image information being separated for each specific color; and
collectively outputting the image information being compressed for each color.

* * * * *